Patented Mar. 4, 1947

2,416,667

UNITED STATES PATENT OFFICE 2,416,667

TREATMENT OF RUBBERY DIENE HYDRO-CARBON POLYMERS PRIOR TO THE INCORPORATION OF COMPOUNDING INGREDIENTS

Herman Elbert Schroeder, Wilmington, Del., assignor to E. I. du Pont de Nemours & Company, Wilmington, Del., a corporation of Delaware No Drawing. Application June 5, 1944,
Serial No. 538,875

27 Claims. (Cl. 260—36)

1

This invention relates to a method of improving the processing characteristics, that is, the ease of mastication and of compounding, of rubbery diene polymers and copolymers.

It is well known in the rubber manufacturing art that the usefulness of any rubber-like material depends in part upon the ease with which this material may be worked or milled so that fillers and curing ingredients can be rapidly and successfully incorporated and dispersed therein. A number of compounds, for example thiols and substituted hydrazines have been used as processing aids for improving the working and milling characteristics of natural rubber. These compounds are only moderately effective for this purpose with synthetic rubbers and they have certain disadvantages, for example disagreeable odor in the thiols and toxicity in the hydrazines.

An object of this invention is to provide a method of improving the working and milling characteristics of rubbery polymers, including copolymers, of conjugated diene hydrocarbons so that processing operations prior to vulcanization are materially facilitated. A further object is to provide a class of compounds which increase the ease of milling of diene polymers and copolymers when added in small amounts. Further objects will appear hereinafter.

These objects are accomplished in accordance with the present invention by milling, i. e. doing internal work upon, a mixture of an unvulcanized rubbery polymer of an acyclic conjugated diene hydrocarbon with a small amount of a metal salt of an N-halogen amide in which the halogen is chlorine, bromine, or iodine and preferably chlorine or bromine and the metal is at least thrice removed in a period of the periodic table from group 0 and is preferably a polyvalent heavy metal. The addition of as little as 0.25% to 5% of the metal salt of an N-halogen amide to the rubbery conjugated diene hydrocarbon polymer during milling reduces, by as much as 85%, the time necessary to break down the polymer to a smooth, continuous sheet which is capable of readily taking up compounding ingredients.

In the preferred process of this invention, a small amount of the metal salt of an N-chloroamide is added to the rubbery hydrocarbon diene polymer on a rubber mill or in an internal mixer and mastication is continued until the rubbery

2 polymer or copolymer becomes soft and plastic. If the process is carried out on a rubber mill, the material in a short time forms a continuous rolling sheet free from holes. The time required for the rubbery polymer or copolymer to reach the state at which compounding ingredients are readily dispersed therein is markedly less than if milling is continued without the addition of the metal salt of the N-chloroamide.

The more detailed practice of this invention is illustrated by the following examples in which parts are given by weight.

Example I

Twenty (20) parts of a rubbery copolymer prepared from a mixture of 75 parts of 1,3-butadiene and 25 parts of styrene, known commercially as GR-S, is placed on a six inch rubber mill heated to 70° C. and the mill is set so that the opening between the rolls is 18 gauge. Then, 0.4 part of zinc N-chloro-5-methyl-5-isobutylhydantoin is added to the rubbery material and milling continued. After milling seventeen minutes, the synthetic rubber forms a smooth, continuous sheet which grips the mill roll firmly, contains no holes, and is ready for compounding. Another 20 parts of this same batch of GR-S containing no added zinc salt of the chlorohydantoin is milled under exactly the same conditions, but ninety minutes' milling is required to break down the rubber to a smooth, continuous sheet free from holes and readily compounded. The presence of the zinc N-chloro-5-methyl-5-isobutylhydantoin effects an 81% reduction in the milling time required to reach the same state required for satisfactory compounding.

Example II

A copolymer prepared from a mixture of about 60 parts of 1,3-butadiene and about 40 parts of acrylonitrile and known to the industry as Hycar-OR-15 is treated with 2% of zinc N-chloro-5-methyl-5-isobutylhydantoin on a mill in the same manner as described in Example I. Only 16.5 minutes' milling is required to obtain a continuous sheet free of holes whereas 54.5 minutes' milling is required when the polymer is milled alone. This represents a 70% reduction in milling time.

Example III

A sample of GR-S similar to that described in Example I is milled as described in Example I. After 63 minutes, the synthetic rubber is broken down to a continuous sheet ready for compounding. Substantial reductions in the milling time required to reach this same state are realized by adding 4% of various metal salts of N-chloro-5-methyl-5-isobutylhydantoin as is shown below:

| Salt of N-chloro-5-methyl-5-isobutylhydantoin | Milling time | Per cent reduction in milling time |
| --- | --- | --- |
| | Min. | |
| Nickel | 11.5 | 82 |
| Silver | 18.5 | 69 |
| Cadmium | 22.0 | 65 |
| Aluminum | 23.0 | 64 |
| Ferric | 30.5 | 52 |

Example IV

Milling of GR-S similar to that described in Example I with 4% of the zinc salts of N-chlorohydantoins shown below results in substantial reductions in the time required to break down the rubbery polymer to a soft, plastic sheet free of holes, viz.

| Zinc salt of— | Per cent reduction in milling time |
| --- | --- |
| N-chloro-5,5-dimethylhydantoin | 72 |
| N-chloro-5-methyl-5-ethylhydantoin | 76 |
| N-chloro-pentamethylenehydantoin | 73 |

Example V

As described in Example I, GR-S is milled with 4% of the zinc salts of the following N-chlorosulfonamides:

| Zinc salt of— | Per cent reduction in milling time |
| --- | --- |
| N-chloro-p-toluenesulfonamide | 38 |
| Cyclohexane-1,4-bis-(N-chlorosulfonamide) | 22 |

The time required to form a continuous sheet is reduced appreciably by the addition of these salts as is shown in the table.

Example VI

Natural rubber (pale crepe) is milled as described in Example I. After 6.5 minutes, the rubber forms a continuous sheet free from holes. The rubber is milled for a total of ten minutes and then has a plasticity recovery of 114–17 as measured by the Williams parallel plate Plastometer. When a mixture of the same rubber with 2% of zinc N-chloro-5-methyl-5-isobutylhydantoin is milled, a continuous sheet free of holes is formed in five minutes. After milling for a total of ten minutes, this rubber shows a plasticity-recovery value of only 93–0. The reduction in milling time brought about by the zinc salt is 23%.

The metal salts of N-halogen amides in which the halogen is chlorine, bromine or iodine and preferably chlorine or bromine, and the metal is at least thrice removed (separated by at least two spaces in a period) from group 0 and is preferably a polyvalent heavy metal are useful in the practice of this invention. These metals include zinc, copper, cadmium, nickel, iron, cobalt, tin, aluminum, silver and the like. Of these, the polyvalent heavy metal salts, i. e. salts of those metals having a valence of at least two and a specific gravity of above 4.0 are preferred.

The compounds useful in improving the milling properties of the rubbery hydrocarbon diene polymers are all salts of N-halogen amides having the group

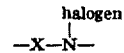

wherein X is CO or SO$_2$, and the halogen is chlorine, bromine, or iodine and preferably chlorine or bromine. In these compounds, a metal atom of an element at least thrice removed from group 0 is attached to a nitrogen adjoining the CO or the SO$_2$ groups. Included in this class are the metal salts of the N-chlorocarbonamides, for example zinc N-chloroacetamide, copper N-chlorohexanamide, nickel N-chlorododecanamide, tin N-chlorooctadecanamide, the metal salts of the N-chlorohydantoins of the formula

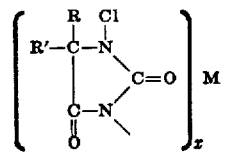

wherein M is a metal at least thrice removed in a period from group 0 and is preferably a polyvalent heavy metal and $x$ is the valence of said metal, and R and R' are hydrogen or hydrocarbon. Compounds of this type are illustrated in Examples I to IV. Additional compounds include the copper, mercury, tin and cerium salts of N-chloro-5-methyl-5-isobutylhydantoin, zinc N-chloro-5-methyl-5-amylhydantoin, zinc N-chloro-5-methyl-5-phenylhydantoin and the like. Also included in this class are the polyvalent heavy metal salts of the N-chlorosulfonamides as illustrated by Example V. Additional salts of N-halogensulfonamides are zinc N-chlorobutanesulfonamide, zinc N-chloromethanesulfonamide, zinc N-chlorobenzenesulfonamide, copper N-chlorobenzenesulfonamide, tin N-chlorobenzenesulfonamide, zinc N-bromo-p-toluenesulfonamide, zinc N-iodopropionamide, nickel N-chloropropanesulfonamide and the like.

The unvulcanized rubbery polymers of conjugated acyclic diene hydrocarbons, the milling characteristics of which are improved by this invention, include natural rubber and synthetic isoprene polymers, 1,3-butadiene polymers, copolymers containing major amounts of 1,3-butadiene or isoprene and minor amounts of styrene. Of these the synthetic rubbery polymers of conjugated diene hydrocarbons, in particular copolymers such as 75:25 butadiene/styrene (GR-S) copolymers containing a major proportion of the hydrocarbon diene constituent are preferred since improvements in milling characteristics are most marked when these elastomers are treated in accordance with the process of this invention. The invention is also applicable to copolymers containing major amounts of 1,3-butadiene or isoprene and minor amounts of other vinyl or vinylidene compounds, for example acrylonitrile, methyl methacrylate, dimethyl(vinylethinyl)carbinol, methyl beta-vinyl acrylate, vinylidene chloride, vinylpyridine, methyl vinyl ketone, vinyl naphthalene, and alpha-methylstyrene.

The processing aids of this invention may be used at temperatures between 25° and 150° C. The metal salt of the N-chloroamide may be added to the rubbery polymer of the hydrocarbon diene as a powder, or it may first be dissolved in a suitable solvent, for example esters, e. g. ethyl acetate, triacetin, butyl sebacate; ethers, e. g. ethylene glycol monomethyl ether, ethylene glycol dimethyl ether, diethylene glycol monomethyl ether, dioxane; alcohols, e. g. isopropyl alcohol; chlorinated hydrocarbons, e. g. chloroform. The improvement in milling and working properties of the rubbery hydrocarbon diene polymers through the addition of the metal salts of the N-chloroamides is particularly evident when the salts are incorporated in the diene polymer or copolymer on a rubber mill. Improved working properties are also obtained however when the diene polymers or copolymers are mixed with the metal salts of N-chloroamides by other means, for example in an internal mixer.

Small amounts, i. e. from 0.25% to 5% of the metal salts of the N-chloroamides by weight, based on the weight of the diene polymer used, are sufficient to reduce materially the time necessary for milling the polymeric materials to attain the physical state where they may be readily compounded with compounding ingredients, for example fillers and curing agents. On a rubber mill, this point is reached when the rubbery polymeric material forms a soft, smooth, continuous sheet free from holes and of good tack. Larger amounts of the N-chloroamide salts can be used, but these do not usually offer any advantages over the use of smaller amounts. An outstanding advantage of the use of the metal salts of the N-chloroamides used in connection with the rubbery diene polymers is that they reduce the time required for the fabrication of useful articles from these polymers, reduce the total power requirements for milling, and allow greater production of finished goods per unit of equipment. Furthermore, only small amounts are necessary so that while the ease of milling of the rubbery polymer is greatly improved, the properties of the final vulcanizate are not materially affected by the addition of these compounds.

Although this invention has been described mostly in terms of the metal salts of the N-chloroamides, other halogen derivatives, for example, the bromide and iodine derivatives are also effective. The bromine and chlorine derivatives are preferred.

The above description and examples are intended to be illustrative only. Any modification of or variation therefrom which corresponds to the spirit of the invention is intended to be included within the scope of the claims.

What is claimed is:

1. Process for bringing a rubbery, unvulcanized polymer of an acyclic conjugated diene hydrocarbon into condition for the incorporation of compounding ingredients which comprises masticating, a mixture of said polymer with a small amount of a polyvalent heavy metal salt of an N-halogen amide wherein the halogen is selected from the class consisting of chlorine, bromine, and iodine.

2. Process according to claim 1 wherein the polymer is a polymer of butadiene-1,3.

3. Process according to claim 1 wherein the polymer is a copolymer of about three parts of butadiene-1,3 with one part of styrene.

4. Process for bringing a rubbery, unvulcanized polymer of an acyclic conjugated diene hydrocarbon into condition for the incorporation of compounding ingredients which comprises masticating said polymer with 0.25 to 5%, based on the weight of said polymer, of a polyvalent heavy metal salt of an N-halogen amide wherein the halogen is selected from the class consisting of chlorine, bromine, and iodine.

5. Process according to claim 4 wherein the polymer is a polymer of butadiene-1,3.

6. Process according to claim 4 wherein the polymer is a copolymer of about three parts of butadiene-1,3 and one part of styrene.

7. Process for bringing a rubbery, unvulcanized polymer of butadiene-1,3 into condition for the incorporation of compounding ingredients which comprises masticating said polymer with a small amount of a polyvalent heavy metal salt of an N-bromoamide.

8. Process for bringing a rubbery, unvulcanized polymer of butadiene-1,3 into condition for the incorporation of compounding ingredients which comprises masticating said polymer with a small amount of a polyvalent heavy metal salt of an N-chloroamide.

9. Process for bringing a rubbery, unvulcanized polymer of butadiene-1,3 into condition for the incorporation of compounding ingredients which comprises masticating said polymer with a small amount of a polyvalent heavy metal salt of an N-chlorohydantoin.

10. Process for bringing a rubbery, unvulcanized polymer of butadiene-1,3 into condition for the incorporation of compounding ingredients which comprises masticating said polymer with a small amount of a polyvalent heavy metal salt of an N-chloro-5,5-dialkylhydantoin.

11. Process for bringing a rubbery, unvulcanized polymer of butadiene-1,3 into condition for the incorporation of compounding ingredients which comprises masticating said polymer with a small amount of a zinc salt of an N-chlorohydantoin.

12. Process for bringing a rubbery, unvulcanized polymer of butadiene-1,3 into condition for the incorporation of compounding ingredients which comprises masticating said polymer with a small amount of a zinc salt of an N-chloro-5,5-dialkylhydantoin.

13. Process for bringing a rubbery, unvulcanized polymer of styrene with a major proportion of butadiene-1,3 into condition for the incorporation of compounding ingredients which comprises masticating said polymer with a small amount, in the order of 0.25% to 5%, by weight of the polymer, of a zinc salt of an N-chloroamide.

14. Process which comprises masticating a rubbery copolymer of about three parts of butadiene-1,3 with one part of styrene with a small amount of a zinc salt of an N-chloro-5,5-dialkylhydantoin.

15. A composition comprising a rubbery, unvulcanized polymer of an acyclic conjugated diene hydrocarbon and a small amount of a polyvalent heavy metal salt of an N-halogen amide, the halogen being selected from the class consisting of chlorine, bromine, and iodine.

16. A composition comprising a rubbery, unvulcanized polymer of an acyclic conjugated diene hydrocarbon and 0.25 to 5%, based on the weight of the polymer, of a polyvalent heavy metal salt of an N-halogen amide wherein the halogen is selected from the class consisting of chlorine, bromine, and iodine.

17. A composition comprising a rubbery, unvulcanized polymer of an acyclic conjugated diene hydrocarbon and 0.25 to 5%, based on the weight of the polymer, of a polyvalent heavy metal salt of an N-bromoamide.

18. A composition comprising a rubbery, unvulcanized polymer of an acyclic conjugated diene hydrocarbon and 0.25 to 5%, based on the weight of the polymer, of a polyvalent heavy metal salt of an N-chloroamide.

19. A composition comprising a rubbery, unvulcanized polymer of an acyclic conjugated diene hydrocarbon and 0.25 to 5%, based on the weight of the polymer, of a zinc salt of an N-chloroamide.

20. Process for bringing a rubbery, unvulcanized polymer of an acyclic conjugated diene hydrocarbon into condition for the incorporation of compounding ingredients which comprises masticating a mixture of said polymer with a small amount, in the order of 0.25% to 5.0%, of a polyvalent heavy metal salt of an N-bromoamide.

21. Process for bringing a rubbery, unvulcanized polymer of an acyclic conjugated diene hydrocarbon into condition for the incorporation of compounding ingredients which comprises masticating a mixture of said polymer with a small amount, in the order of 0.25% to 5.0%, of a polyvalent heavy metal salt of an N-chloroamide.

22. Composition according to claim 15 wherein the salt is a zinc salt.

23. A composition comprising a rubbery copolymer of about three parts of butadiene-1,3 with one part of styrene and, as a processing aid therefor, a zinc salt of an N-chlorohydantoin.

24. A composition comprising a rubbery copolymer of about three parts of butadiene-1,3 with one part of styrene and, as a processing aid therefor, a zinc salt of an N-chloro-5,5-dialkylhydantoin.

25. The process of claim 1 wherein the polymer is a rubbery butadiene/styrene copolymer having a major proportion of btuadiene-1,3.

26. A process which comprises masticating a rubbery butadiene/styrene copolymer having a major proportion of butadiene-1,3 with a small amount of a zinc salt of an N-chloro-5,5-dialkylhydantoin.

27. A composition comprising a rubbery butadiene/styrene copolymer having a major proportion of butadiene-1,3 and, as a processing aid therefor, a zinc salt of an N-chlorohydantoin.

HERMAN ELBERT SCHROEDER.

REFERENCES CITED

The following references are of record in the file of this patent:

UNITED STATES PATENTS

| Number | Name | Date |
|---|---|---|
| 2,325,947 | Garvey | Aug. 3, 1943 |

---

Certificate of Correction

Patent No. 2,416,667.　　　　　　　　　　　　　　　March 4, 1947.

HERMAN ELBERT SCHROEDER

It is hereby certified that errors appear in the printed specification of the above numbered patent requiring correction as follows: Column 5, line 49, for "bromide" read *bromine*; column 8, line 11, for "btuadiene" read *butadiene*; and that the said Letters Patent should be read with these corrections therein that the same may conform to the record of the case in the Patent Office.

Signed and sealed this 6th day of May, A. D. 1947.

[SEAL]

LESLIE FRAZER,
*First Assistant Commissioner of Patents.* of the polymer, of a polyvalent heavy metal salt of an N-bromoamide.

18. A composition comprising a rubbery, unvulcanized polymer of an acyclic conjugated diene hydrocarbon and 0.25 to 5%, based on the weight of the polymer, of a polyvalent heavy metal salt of an N-chloroamide.

19. A composition comprising a rubbery, unvulcanized polymer of an acyclic conjugated diene hydrocarbon and 0.25 to 5%, based on the weight of the polymer, of a zinc salt of an N-chloroamide.

20. Process for bringing a rubbery, unvulcanized polymer of an acyclic conjugated diene hydrocarbon into condition for the incorporation of compounding ingredients which comprises masticating a mixture of said polymer with a small amount, in the order of 0.25% to 5.0%, of a polyvalent heavy metal salt of an N-bromoamide.

21. Process for bringing a rubbery, unvulcanized polymer of an acyclic conjugated diene hydrocarbon into condition for the incorporation of compounding ingredients which comprises masticating a mixture of said polymer with a small amount, in the order of 0.25% to 5.0%, of a polyvalent heavy metal salt of an N-chloroamide.

22. Composition according to claim 15 wherein the salt is a zinc salt.

23. A composition comprising a rubbery copolymer of about three parts of butadiene-1,3 with one part of styrene and, as a processing aid therefor, a zinc salt of an N-chlorohydantoin.

24. A composition comprising a rubbery copolymer of about three parts of butadiene-1,3 with one part of styrene and, as a processing aid therefor, a zinc salt of an N-chloro-5,5-dialkylhydantoin.

25. The process of claim 1 wherein the polymer is a rubbery butadiene/styrene copolymer having a major proportion of btuadiene-1,3.

26. A process which comprises masticating a rubbery butadiene/styrene copolymer having a major proportion of butadiene-1,3 with a small amount of a zinc salt of an N-chloro-5,5-dialkylhydantoin.

27. A composition comprising a rubbery butadiene/styrene copolymer having a major proportion of butadiene-1,3 and, as a processing aid therefor, a zinc salt of an N-chlorohydantoin.

HERMAN ELBERT SCHROEDER.

REFERENCES CITED

The following references are of record in the file of this patent:

UNITED STATES PATENTS

| Number | Name | Date |
|---|---|---|
| 2,325,947 | Garvey | Aug. 3, 1943 |

---

Certificate of Correction

Patent No. 2,416,667.   March 4, 1947.

HERMAN ELBERT SCHROEDER

It is hereby certified that errors appear in the printed specification of the above numbered patent requiring correction as follows: Column 5, line 49, for "bromide" read *bromine*; column 8, line 11, for "btuadiene" read *butadiene*; and that the said Letters Patent should be read with these corrections therein that the same may conform to the record of the case in the Patent Office.

Signed and sealed this 6th day of May, A. D. 1947.

[SEAL]

LESLIE FRAZER,
*First Assistant Commissioner of Patents.*